(12) United States Patent
Sadeghi et al.

(10) Patent No.: US 9,369,551 B2
(45) Date of Patent: Jun. 14, 2016

(54) APPARATUS, SYSTEM AND METHOD OF PROTOCOL ADAPTATION LAYER (PAL) COMMUNICATION TO INDICATE TRANSITIONING A DEVICE TO A DEFAULT STATE

(71) Applicant: Intel Corporation, Santa Clara, CA (US)

(72) Inventors: Bahareh Sadeghi, Portland, OR (US); Marek Dabek, Gdansk (PL); Rafal Wielicki, Gdansk (PL); Elad Levy, Nes Ziona (IL)

(73) Assignee: INTEL CORPORATION, Santa Clara, CA (US)

( * ) Notice: Subject to any disclaimer, the term of this patent is extended or adjusted under 35 U.S.C. 154(b) by 210 days.

(21) Appl. No.: 14/129,297

(22) PCT Filed: Sep. 8, 2013

(86) PCT No.: PCT/US2013/058659
§ 371 (c)(1),
(2) Date: Dec. 26, 2013

(87) PCT Pub. No.: WO2014/185941
PCT Pub. Date: Nov. 20, 2014

(65) Prior Publication Data
US 2014/0341110 A1    Nov. 20, 2014

Related U.S. Application Data

(60) Provisional application No. 61/824,078, filed on May 16, 2013.

(51) Int. Cl.
*H04L 12/24* (2006.01)
*H04L 29/06* (2006.01)
*H04W 80/04* (2009.01)

(52) U.S. Cl.
CPC .............. *H04L 69/16* (2013.01); *H04W 80/04* (2013.01)

(58) Field of Classification Search
None
See application file for complete search history.

(56) References Cited

U.S. PATENT DOCUMENTS

| 5,317,693 A | * | 5/1994 | Cuenod ............... G06F 9/4411 370/257 |
| 2009/0170519 A1 | | 7/2009 | Wilhoite et al. |

(Continued)

OTHER PUBLICATIONS

WiGig Whit Paper Defining the Future of Multi-Gigabit Wireless Communications, Jul. 2010.*

(Continued)

*Primary Examiner* — Thai Nguyen
(74) *Attorney, Agent, or Firm* — Shichrur & Co.

(57) ABSTRACT

Some demonstrative embodiments include apparatuses, systems and/or methods of transitioning a device to a default state. For example, an apparatus may include a first Protocol Adaptation Layer (PAL) communication unit to communicate PAL traffic with a second PAL communication unit over a communication link, the PAL traffic comprising traffic of a PAL connection over a PAL, the PAL is above a layer of the communication link, wherein the first PAL communication unit is to communicate a device reset request and a device reset response with the second PAL communication unit over the communication link, the device reset request indicating transitioning of a peripheral device to a default state, the device reset response in response to the device reset request, the device reset response indicating whether the device reset request is successfully handled.

26 Claims, 4 Drawing Sheets

(56) References Cited

U.S. PATENT DOCUMENTS

| | | |
|---|---|---|
| 2009/0198859 A1 | 8/2009 | Orishko et al. |
| 2010/0153973 A1 | 6/2010 | Gupta et al. |
| 2011/0219279 A1 | 9/2011 | Abu-Surra et al. |
| 2013/0042291 A1 | 2/2013 | Kambhatla |
| 2013/0282938 A1* | 10/2013 | Huang .................. G06F 13/385 710/106 |

OTHER PUBLICATIONS

International Search Report and Written Opinion for PCT Patent Application No. PCT/US2013/058659, mailed on Feb. 14, 2014, 12 pages.

Wireless Gigabit Alliance (WGA) Specifications; WiGig MAC and PHY Specification Version 1.1, Apr. 2011—Final Specification; 442 pages.

IEEE Std 802.11™—2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012.

IEEE Std 802.11ad™—2012. IEEE Standard for Information technology—Telecommunications and information exchange between systems Local and metropolitan area networks—Specific requirements Part 11: Wireless LAN Medium Access Control (MAC) and Physical Layer (PHY) Specifications Amendment 3: Enhancements for Very High Throughput in the 60 GHz Band, Dec. 28, 2012.

Wi-Fi Alliance Technical Committee P2P Task Group; Wi-Fi Peer-to-Peer (P2P) Technical Specification; Version 1.2; Dec. 14, 2011; 160 pages.

Universal Serial Bus Specification, Revision 1.0, Jan. 15, 1996, 268 pages.

Universal Serial Bus Specification, Revision 2.0, Apr. 27, 2000, 650 pages.

Universal Serial Bus 3.0 Specification, Revision 1.0, Jun. 6, 2011, 531 pages.

International Preliminary Report on Patentability for International Application No. PCT/US2013/058659, mailed on Nov. 26, 2015, 8 pages.

* cited by examiner

US 9,369,551 B2

APPARATUS, SYSTEM AND METHOD OF PROTOCOL ADAPTATION LAYER (PAL) COMMUNICATION TO INDICATE TRANSITIONING A DEVICE TO A DEFAULT STATE

CROSS REFERENCE

This application is a National Phase Application of PCT International Application No. PCT/US2013/058659, International Filing Date Sep. 8, 2013, which in turn claims the benefit of and priority from U.S. Provisional Patent application No. 61/824,078 entitled "Mechanisms for reset of a USB device in a media-agnostic USB solution", filed May 16, 2013, the entire disclosures of which are incorporated herein by reference.

TECHNICAL FIELD

Embodiments described herein generally relate to Protocol Adaptation Layer (PAL) communication to indicate transitioning a device to a default state.

BACKGROUND

Some wireless communication technologies may be configured for communication of various dedicated services.

For example, the Wireless-Gigabit (WiGig) technology, e.g., according to the *Wireless Gigabit Alliance, Inc WiGig MAC and PHY Specification Version* 1.1, *April* 2011, *Final specification*, is designed to carry multiple dedicated services, such as audio-visual (A/V) and input output (I/O).

The WiGig Alliance (WGA) has defined a set of Protocol Abstraction Layers (PALs), e.g., a WiGig Serial Extension (WSE) PAL and a WiGig Display Extension (WDE) PAL, that standardize the method of transporting traffic of specific industry-standard protocols, e.g. Universal Serial Bus (USB) and DisplayPort, over the WiGig media access control (MAC) layer. Other PALs may be defined with respect to other communication links, e.g., Wireless Fidelity (WiFi) links.

The WSE defines a WSE host communicating with a WSE device over a WiGig wireless link interface. The WSE host can connect and control several WSE devices. Each WSE device can include several USB ports, and each USB port can be attached to a USB device or be extended to several ports via a USB hub.

Since USB devices and/or USB hosts may be configured for communicating over a physical medium, e.g., a USB cable, there may be a problem to perform some operations, e.g., in an efficient seamless and/or transparent manner, via the WSE PAL.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DESCRIPTION OF EMBODIMENTS

Figure 1:
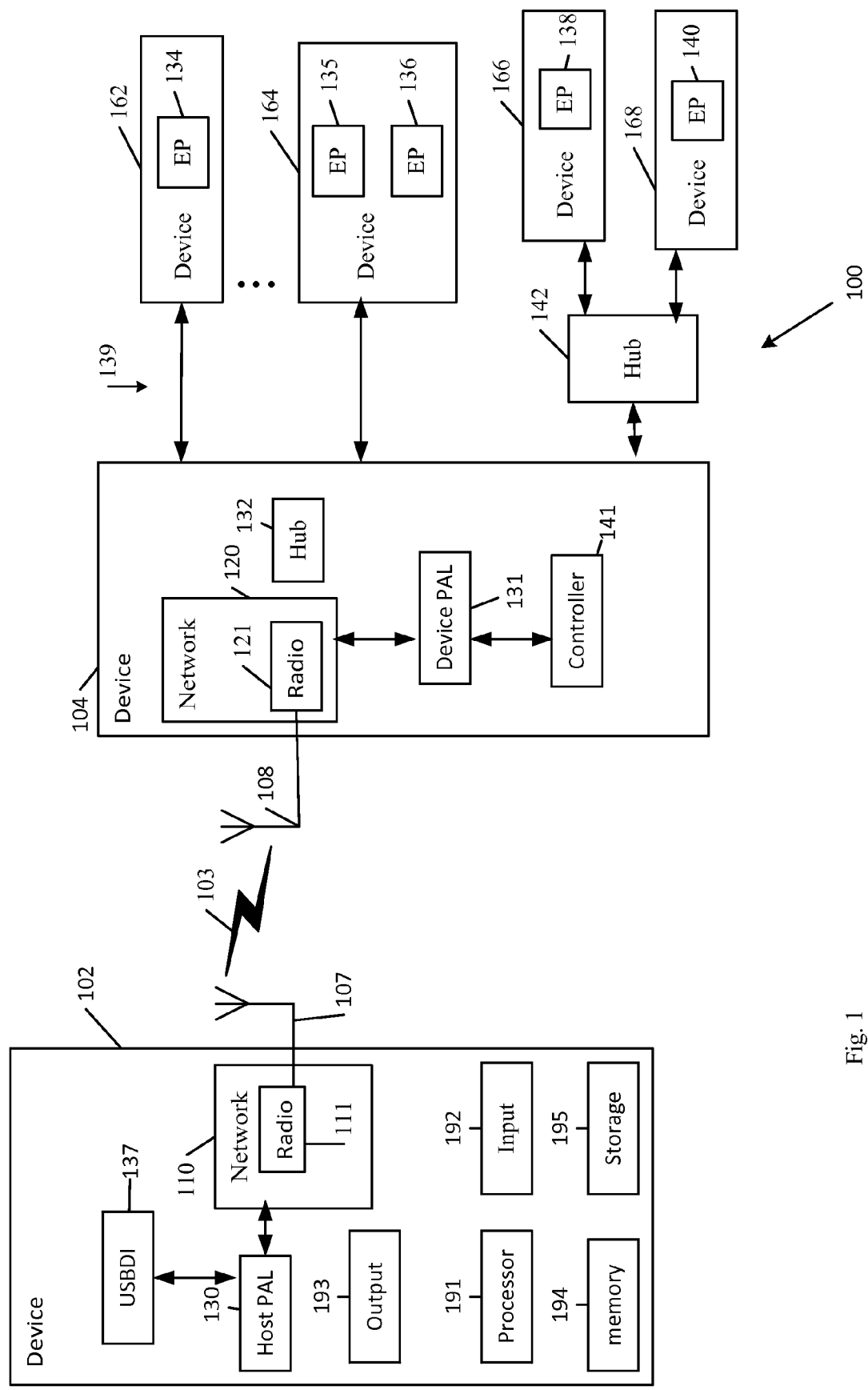
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment," "an embodiment," "demonstrative embodiment," "various embodiments," etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Wireless-Gigabit-Alliance (WGA or WiGig) specifications (*Wireless Gigabit Alliance, Inc WiGig MAC and PHY*

Specification Version 1.1, April 2011, Final specification) and/or future versions and/or derivatives thereof, devices and/or networks operating in accordance with existing WiGig Serial Extension (WSE) protocols (*WiGig Serial Extension (WSE) Specification Draft* 1.02, *August* 2012) and/or future versions and/or derivatives thereof, devices and/or networks operating in accordance with existing WiGig Display Extension (WDE) protocols (*WDE Draft Specification* 1.04, *August* 2012) and/or future versions and/or derivatives thereof, devices and/or networks operating in accordance with existing WiGig Bus Extension (WBE) protocols (*WiGig Bus Extension Spec* (*WBE*), *Version* 1.0 *June* 2011) and/or future versions and/or derivatives thereof, devices and/or networks operating in accordance with existing WiGig Secure Digital (SD) Extension (WSD) protocols (*WiGig SD Extension (WSD) PAL Specification Draft* 1.0 *August* 2012) and/or future versions and/or derivatives thereof, devices and/or networks operating in accordance with existing Bulk Only Transfer (BOT) Protocols (*Universal Serial Bus* (*USB*) *Mass Storage Class Bulk-Only Transport, Revision* 1.0, *Sep.* 31, 1999) and/or future versions and/or derivatives thereof, devices and/or networks operating in accordance with existing Wireless Fidelity (WiFi) Alliance (WFA) Peer-to-Peer (P2P) specifications (*WiFi P2P technical specification, version* 1.3, 2012) and/or future versions and/or derivatives thereof, devices and/or networks operating in accordance with existing WiFi Serial Bus (WSB) specifications and/or future versions and/or derivatives thereof, devices and/or networks operating in accordance with existing IEEE 802.11 standards (*IEEE* 802.11-2012, *IEEE Standard for Information technology—Telecommunications and information exchange between systems Local and metropolitan area networks—Specific requirements Part* 11: *Wireless LAN Medium Access Control* (*MAC*) *and Physical Layer* (*PHY*) *Specifications, Mar.* 29, 2012; IEEE802.11 task group ac (TGac) ("*IEEE*802.11-09/0308*r*12—*TGac Channel Model Addendum Document*"); *IEEE* 802.11 *task group ad* (*TGad*) (*IEEE P*802.11*ad/D*9.0 *Draft Standard for Information Technology—Telecommunications and Information Exchange Between Systems—Local and Metropolitan Area Networks—Specific Requirements—Part* 11: *Wireless LAN Medium Access Control* (*MAC*) *and Physical Layer* (*PHY*) *Specifications—Amendment* 5: *Enhancements for Very High Throughput in the* 60 *GHz Band*)), and/or future versions and/or derivatives thereof, devices and/or networks operating in accordance with existing IEEE 802.16 standards (*IEEE-Std* 802.16, 2009 *Edition, Air Interface for Fixed Broadband Wireless Access Systems; IEEE-Std* 802.16*e,* 2005 *Edition, Physical and Medium Access Control Layers for Combined Fixed and Mobile Operation in Licensed Bands; amendment to IEEE Std* 802.16-2009, *developed by Task Group m*) and/or future versions and/or derivatives thereof, devices and/or networks operating in accordance with existing WirelessHD™ specifications and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), WiGig, Wi-Fi, Internet-Protocol (IP), Wi-Max, ZigBee™, Ultra-Wideband (UWB), Global System for Mobile communication (GSM), 3rd Generation Partnership Project (3GPP), 2G, 2.5G, 3G, 3.5G, Long Term Evolution (LTE), LTE advanced, Fifth Generation (5G) mobile networks, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit.

Some demonstrative embodiments may be used in conjunction with suitable limited-range or short-range wireless communication networks, for example, a wireless area network, a "piconet", a WPAN, a WVAN and the like. Other embodiments may be used in conjunction with any other suitable wireless communication network.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmwave) frequency band), e.g., a frequency band within the frequency band of between 30 Ghz and 300 GHZ, a WLAN frequency band, a WPAN frequency band, a frequency band according to the WGA specification, a WiFi band, a P2P band, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The term "station" (STA), as used herein, may include any logical entity that is a singly addressable instance of a medium access control (MAC) and a physical layer (PHY) interface to a wireless medium (WM).

The phrase "access point" (AP), as used herein, may include an entity that contains one station (STA) and provides access to distribution services, via the WM for associated STAs.

The term "beamforming", as used herein, may relate to a spatial filtering mechanism, which may be used at a transmitter and/or a receiver to improve the received signal power or signal-to-noise ratio (SNR) at an intended receiver.

The phrase "non-access-point (non-AP) station (STA)", as used herein, may relate to a STA that is not contained within an AP.

The phrases "directional multi-gigabit (DMG)" and "directional band" (DBand), as used herein, may relate to a frequency band wherein the Channel starting frequency is above 40 GHz.

The phrases "DMG STA" and "mmWave STA (mSTA)" may relate to a STA having a radio transmitter, which is operating on a channel that is within the DMG band.

The phrase "peer to peer (PTP or P2P) communication", as used herein, may relate to device-to-device communication over a wireless link ("peer-to-peer link") between a pair of devices. The P2P communication may include, for example, wireless communication over a direct link within a QoS basic service set (BSS), a tunneled direct-link setup (TDLS) link, a STA-to-STA communication in an independent basic service set (IBSS), or the like.

A wireless P2P wireless communication network ("P2P network" or "P2P group") may include a plurality of wireless communication devices capable of supporting device-to device communication.

The phrase "Protocol Adaptation Layer (PAL)", as used herein, may include an abstraction layer configured to enable transporting traffic of at least one predefined protocol over a communication link. The predefined protocol may include, for example, a specific industry-standard protocol, e.g. USB, DisplayPort, and the like. The PAL may be above a layer of the communication link. For example, the PAL may be above a data link layer, for example, a MAC layer, and/or above a transport layer, e.g., a Transmission Control Protocol (TCP) or User Datagram Protocol (UDP), which is above the data link layer.

In one example, the data link layer may include, for example, a MAC layer of a wireless link, e.g., a WiFi MAC layer, a WiGig MAC layer, a P2P MAC layer, and the like. In another example, the PAL may be above a transport layer, e.g., a TCP or UDP, which may be configured for transporting traffic over an IP network, e.g., a wired or wireless Internet link and/or Ethernet link.

Some demonstrative embodiment are described herein with respect to a PAL connection over a wireless communication link, for example, a WiGig link or a WiFi link, e.g., as described below. However, other embodiments may include a PAL connection over any other wired or wireless communication link, e.g., an IP link.

The phrase "PAL communication unit", as used herein, may include a communication element to manage a PAL connection between a first architectural element, for example, a PAL host, e.g., a USB host, and a second architectural element, for example, a PAL device, e.g., a USB device, over a communication link, e.g., a MAC layer link or a transport layer link, between the PAL communication unit and another PAL communication unit. For example, a first PAL communication unit may communicate PAL traffic with a second PAL communication unit over a communication link. The PAL traffic may include traffic of a PAL connection, over a PAL, between first and second devices, e.g., a host device and a USB device.

In some demonstrative embodiments, the PAL communication unit (also referred to as "PAL manager" or "PAL controller") may perform the functionality of, may include, or may be implemented as part of a service set, for example, a WSE Service Set (WSS) or a Media Agnostic (MA) USB Service Ste (MASS). For example, the PAL communication unit may perform at least part of the functionality of a MA-USB device, a WSE device, a MA-USB host, or a WSE host, e.g., as described below. In other embodiments, the PAL communication unit may perform the functionality of any other PAL device, element and/or module.

The phrases "MA-USB device" and "WSE device", as used herein, may include, for example, a MA-USB or WSE architectural element that integrates, and/or is associated with, at least one device, e.g., a USB device, and manages transfers, e.g., USB transfers, targeting the integrated device over a network connection. In one example, the integrated device may be connected, for example, through a wired USB, e.g., USB cable, USB chip-to-chip interconnect, and/any other technologies. For example, the integrated device may be presented through the MA-USB device or WSE device to a host as a USB device compliant with a USB specification, e.g., the USB 2.0 and/or USB 3.0 Specifications.

In one example, the MA-USB device may optionally include any computing platform, e.g., a portable device, which houses and/or performs the functionality of the MA-USB device and, optionally, one or more additional elements, e.g., drivers and/or application software, configured to perform the functionality of a peripheral device. In other embodiments, the MA-USB device may include and/or may be implemented by any other portable or non-portable device.

In some demonstrative embodiments, the MA-USB device may include USB device logic, e.g., for communicating with a USB device according to a USB Specification, a MA-USB device PAL, e.g., to control communication over the PAL, and a network interface, e.g., to communicate over the communication link. For example, the MA-USB device PAL may interface between the USB device logic and the network interface, e.g., in a transparent manner. In other embodiments, the MA-USB device may include any other elements. In one example, the PAL communication unit may perform the functionality of at least the MA-USB device PAL.

The phrases "MA-USB host" and "WSE host", as used herein, may include an architectural element of the MA-USB PAL or WSE PAL that includes a communication architecture, e.g., a WiGig or WiFi MAC and PHY, and USB host logic, e.g., as defined by a USB specification, e.g., the USB 2.0 and/or USB 3.0 Specifications.

In one example, the MA-USB host or WSE host may optionally include any computing platform, e.g., a personal computer, which houses and/or performs the functionality of the MA-USB host or WSE host and, optionally, one or more additional elements, e.g., drivers and/or application software, configured to perform the functionality of a host device. In other embodiments, the MA-USB host or WSE host may include and/or may be implemented by any other portable or non-portable device.

In some demonstrative embodiments, the MA-USB host may include USB host logic, e.g., for communicating with a USB host according to a USB Specification, a MA-USB host PAL, e.g., to control communication over the PAL, and a network interface, e.g., to communicate over the communication link. For example, the MA-USB host PAL may interface between the USB host logic and the network interface, e.g., in a transparent manner. In other embodiments, the MA-USB host may include any other elements. In one example, the PAL communication unit may perform the functionality of at least the MA-USB host PAL.

An endpoint may include, for example, an architectural element, which is associated with a first device, which in turn is configured to interface between the endpoint and a second device over a communication link. For example, the endpoint may be integrated as part of the first device or connected to the first device via one or more other devices and/or connections. The endpoint may be implemented, for example, using any technology, e.g., software, hardware and/or any combination thereof. The first device may include and/or interface between one or more endpoints and the second device.

In one example, the first device may include a MA-USB device and the second device may include a MA-USB host. For example, the endpoint may belong to a USB device, e.g., a USB device, which may be integrated into the MA-USB device or connected, e.g., through a wired USB connection, to the MA-USB device, e.g., via a hub integrated into the MA-USB device.

According to this example, the endpoint may be uniquely identified by the MA-USB host. For example, a combination of a MA-USB device address of the MA-USB device and a MA-USB EP handle assigned to the endpoint may uniquely identify a USB device endpoint within a MA-USB service set.

In other examples, the first and second devices may include any other, e.g., non-MA-USB, non-WSE and/or non-USB, device and the endpoint may perform the functionality of any other, e.g., non-USB, non-MA-USB and/or non-WSE, element.

Reference is now made to FIG. 1, which schematically illustrates a block diagram of a system 100, in accordance with some demonstrative embodiments.

As shown in FIG. 1, in some demonstrative embodiments, system 100 may include a communication network including one or more communication devices, e.g., devices 102 and/or 104, capable of communicating content, data, information and/or signals over a communication medium, for example, a radio channel, an IR channel, a RF channel, a Wireless Fidelity (WiFi) channel, and the like. One or more elements of system 100 may optionally be capable of communicating over any suitable wired communication links.

In some demonstrative embodiments, devices 102 and/or 104 may include, for example, a PC, a desktop computer, a mobile computer, a laptop computer, a notebook computer, a tablet computer, an Ultrabook™, a server computer, a media center, a mobile internet device, a handheld computer, a handheld device, a storage device, a mass storage device, a USB mass storage (UMS) device, a hard drive, an optical drive, a flash memory device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, devices 102 and/or 104 may include network interfaces 110 and 120, respectively, to perform communication over a communication network between communication devices 102 and 104 and/or with one or more other devices, e.g., as described below.

Devices 102 and/or 104 may also include, for example, one or more of a processor 191, an input unit 192, an output unit 193, a memory unit 194, and a storage unit 195. Devices 102 and/or 104 may optionally include other suitable hardware components and/or software components. In some demonstrative embodiments, some or all of the components of one or more of devices 102 and/or 104 may be enclosed in a common housing or packaging, and may be interconnected or operably associated using one or more wired or wireless links. In other embodiments, components of one or more of communication devices 102 and/or 104 may be distributed among multiple or separate devices.

Processor 191 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of communication devices 102 and/or 104 and/or of one or more suitable applications.

Input unit 192 includes, for example, a keyboard, a keypad, a mouse, a touch-screen, a touch-pad, a track-ball, a stylus, a microphone, or other suitable pointing device or input device. Output unit 193 includes, for example, a monitor, a screen, a touch-screen, a flat panel display, a Cathode Ray Tube (CRT) display unit, a Liquid Crystal Display (LCD) display unit, a plasma display unit, one or more audio speakers or earphones, or other suitable output devices.

Memory unit 194 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by communication devices 102 and/or 104.

In some demonstrative embodiments, network interfaces 110 and/or 120 may include wireless communication units, e.g., including radios 111 and 121, to communicate over a wireless communication medium. For example, radios 111 and/or 121 may include, or may be associated with, one or more antennas 107 and/or 108, respectively. Antennas 107 and/or 108 may include any type of antennas suitable for transmitting and/or receiving wireless communication signals, blocks, frames, transmission streams, packets, messages and/or data. For example, antennas 107 and/or 108 may include any suitable configuration, structure and/or arrangement of one or more antenna elements, components, units, assemblies and/or arrays. Antennas 107 and/or 108 may include, for example, antennas suitable for directional communication, e.g., using beamforming techniques. For example, antennas 107 and/or 108 may include a phased array antenna, a single element antenna, a set of switched beam antennas, and/or the like. In some embodiments, antennas 107 and/or 108 may implement transmit and receive functionalities using separate transmit and receive antenna elements. In some embodiments, antennas 107 and/or 108 may implement transmit and receive functionalities using common and/or integrated transmit/receive elements.

In some demonstrative embodiments, radios 111 and/or 121 may include one or more wireless transmitters, receivers and/or transceivers able to send and/or receive wireless communication signals, RF signals, frames, blocks, transmission streams, packets, messages, data items, and/or data. For example, radios 111 and/or 121 may include or may be implemented as part of a wireless Network Interface Card (NIC), and the like.

In some demonstrative embodiments, devices 102 and 104 may establish a communication link 103. Link 103 may be configured for communication over a data link layer, e.g., the MAC layer, a logical link control (LLC) and/or a transport layer.

In some demonstrative embodiments, link 103 may include an uplink and/or a downlink. For example, the uplink may include a link for communicating data from device 104 to device 102, and/or the downlink may include a link for communicating data from device 102 to device 104.

In one example, the downlink may include, for example, a unidirectional link from an AP to one or more non-AP stations (STAs) or a unidirectional link from a non-AP Destination STA to a non-AP Source STA. The uplink may include, for example, a unidirectional link from a non-AP STA to an AP or a unidirectional link from a non-AP Source STA to a non-AP Destination STA.

In some demonstrative embodiments, link 103 may include a wireless communication link, for example, a WiGig link, a WiFi link or a WLAN link, e.g., as described below.

In other embodiments, link 103 may include any other wireless or wired link, e.g., an IP link. According to these embodiments, network interfaces 110 and/or 120 may include any suitable communication unit, e.g., a wired or wireless communication unit, to communicate over the communication network.

In some demonstrative embodiments, devices 102 and 104 may form, or may be part of, a wireless communication network. The wireless communication network may include, for example, a P2P network or any other network.

In some demonstrative embodiments, devices 102 and/or 104 may perform the functionality of DMG stations ("DMG STA"). For example, communication devices 102 and/or 104 may be configured to communicate over the DMG band.

In some demonstrative embodiments, device 102 may include a mobile device and device 104 may include a docking device to connect device 102 to one or more other devices ("peripherals"), for example, including one or more USB devices, e.g., peripheral devices 162, 164, 166 and/or 168, and/or any other device.

For example, device 102 may include, or may be included as part of a mobile or portable device, for example, a mobile computer, a laptop computer, a notebook computer, a tablet computer, an Ultrabook™, a Smartphone, a handheld computer, a handheld device, a PDA device, a handheld PDA device, an on-board device, an off-board device, a hybrid device, e.g., combining cellular phone functionalities with PDA device functionalities, a consumer device, a vehicular device, a non-vehicular device, a cellular telephone, a PCS device, a PDA device which incorporates a wireless communication device, a mobile or portable GPS device, a relatively small computing device, a non-desktop computer, a CSLL device, a UMD, a UMPC, a MID, an "Origami" device or computing device, a device that supports DCC, a context-aware device, a video device, an audio device, an A/V device, a data source, a Digital Still camera (DSC), a media player, or the like.

In one example, device 104 may include a docking device configured to connect between device 102 and devices 162, 164, 166 and/or 168 via one or more interfaces 139, for example, serial interfaces, e.g., USB interfaces and/or any other interface. Devices 162, 164, 166 and/or 168 may include for example, a mass storage device, e.g., a USB mass storage (UMS) device, a hard drive, an optical drive, a flash memory device, and the like.

In some demonstrative embodiments, device 104 may be connected to devices 162, 164, 166 and/or 168 via one or more USB interfaces 139 supporting one or more data transfer rates. For example, device 104 may be connected to one or more of devices 162, 164, 166 and/or 168 via a first USB interface 139 supporting a first data transfer rate, e.g., a USB1.1 interface supporting a data transfer rate of 12 Mega bit per second (Mbps), device 104 may be connected to one or more of devices 162, 164, 166 and/or 168 via a second USB interface 139 supporting a second data transfer rate, e.g., a USB2 interface supporting a data rate of 480 Mbps, and/or device 104 may be connected to one or more of devices 162, 164, 166 and/or 168 via a third USB interface 139 supporting a third data transfer rate, e.g., a USB3 interface supporting a data transfer rate of up to 4.8 Giga bit per second (Gbps).

In some demonstrative embodiments, device 104 may include a hub 132, e.g., a USB hub, to connect between device 104 and one or more of devices 162, 164, 166 and 168. Additionally or alternatively, device 104 may be connected to one or more of devices 162, 164, 166 and 168 via any USB tree, which may include, for example, one or more USB hubs 142. For example, device 102 may include, or may be connected to, one or more USB ports, and each USB port may be connected to a USB device or be extended to several ports via USB hub 132 and/or USB hub 142.

In some demonstrative embodiments, devices 162, 164, 166 and/or 168 may perform the functionality of one or more Endpoints (EPs). For example, a USB device may perform the functionality of one EP or more than one EP. In one example, device 162 may perform the functionality of an EP 134, device 164 may perform the functionality of an EP 135 and an EP 136, device 166 may perform the functionality of an EP 138, and/or device 168 may perform the functionality of an EP 138.

In some demonstrative embodiments, device 102 may include a PAL communication unit 130, and device 104 may include a PAL communication unit 131. PAL communication units 103 and 131 may be configured to manage a PAL connection between devices 102 and 104 over link 103.

In some demonstrative embodiments, devices 102 and 104 may communicate over link 103 according to a WiGig protocol, a WiFi protocol, a WLAN protocol or any other wired or wireless protocol.

In some demonstrative embodiments, devices 102 and 104 may be configured for communication of various dedicated services. For example, the WiGig technology is designed to carry multiple dedicated services, such as audio-visual (A/V) and input output (I/O).

Some demonstrative embodiments are described herein with reference to communicating a data stream including USB data over a wireless communication link according to a MA-USB or WSE protocol. However, other embodiments may be implemented with respect to communicating any other suitable data over any other communication link, according to any other communication protocol and/or over any other layer or PAL.

In some demonstrative embodiments, device 102 may perform the functionality of a USB host and device 104 may perform the functionality of a USB device.

In some demonstrative embodiments, PAL communication unit 130 may perform the functionality of a MA-USB host or WSE host and PAL communication unit 131 may perform the functionality of a MA-USB device or WSE device.

In some demonstrative embodiments, PAL communication unit 130 may perform the functionality of a Wi-Fi Serial Bus (WSB) host and PAL communication unit 131 may perform the functionality of a WSB device.

In some demonstrative embodiments, PAL communication unit 130 may perform the functionality of a media-agnostic host and PAL communication unit 131 may perform the functionality of a media-agnostic device.

In some demonstrative embodiments, PAL communication units 130 and 131 may communicate PAL over communication link 131. The PAL traffic may include PAL traffic of a PAL connection, over a PAL, e.g., between devices 102 and 104.

In some demonstrative embodiments, PAL communication units 130 and 131 may communicate USB traffic over the PAL via link 103. The USB traffic may include, for example, non-periodic (NP) traffic, e.g., bulk and/or control traffic, and/or periodic traffic, e.g., Isochronous and/or Interrupt traffic, which may be communicated by the EPs 134, 135, 136, 138 and/or 140.

In some demonstrative embodiments, the USB traffic may include traffic ("USB IN") delivered from the EPs the EPs 134, 135, 136, 138 and/or 140, via device 104, to device 102, and/or traffic ("USB OUT") delivered from device 102, via device 104, to the EPs the EPs 134, 135, 136, 138 and/or 140.

In some demonstrative embodiments, the USB PAL may enable transport of USB data over media other than USB cable, for example, wireless links, e.g., Wi-Fi or WiGig links, or wired links, e.g., Ethernet. The USB PAL may directly interface with network interfaces 110 and 120, e.g., to replace a network layer in the Open Systems Interconnection (OSI) model, or may be an IP application, interfacing with an IP (e.g., TCP/IP or UDP/IP) stack.

In some demonstrative embodiments, PAL communication unit 130 and PAL communication unit 131 may be configured to enable media-agnostic connectivity of a PAL between devices 102 and 104.

In some demonstrative embodiments, PAL communication unit 130 and PAL communication unit 131 may be configured to enable connectivity of the PAL between devices 102 and 104 over a wireless communication link, for example, a WiGig link or WiFi, e.g., as described below. However, in other embodiments, PAL communication unit 130 and PAL communication unit 131 may be configured to enable media-agnostic connectivity of the PAL between devices 102 and 104 over any other medium, for example, a WLAN link, an IP link, e.g., internet, Ethernet, over wire or wireless, a media-agnostic link, and the like.

In some demonstrative embodiments, PAL communication units 130 and 131 may be configured to interface, e.g., over link 103, between host logic, for example, a driver at a host platform, e.g., a device interface of device 102, and at least one peripheral controller 141 of device 104.

In some demonstrative embodiments, the at least one peripheral controller 141 may include a controller, which may be implemented, for example, to control one or more peripheral devices connected to the peripheral controller 141, e.g., peripheral devices 162, 164, 166 and/or 168.

In some demonstrative embodiments, the USB PAL may replace a USB physical cable.

For example, PAL communication units 130 and 131 may be configured to interface, e.g., over link 103, between USB host logic, for example, a USB driver at a host platform, e.g., a USB device interface (USBDI) 137 of device 102, and at least one peripheral controller 141, for example, a USB controller ("USB host controller"), of device 104.

For example, peripheral controller 141 may include a USB controller, which may be implemented, for example, to control one or more USB devices connected to the USB controller 141, e.g., USB devices 162, 164, 166 and/or 168. USB controller 141 may be implemented by software, hardware, and/or any combination thereof. In one example, USB controller 141 may, for example, perform the functionality of an extensible Host Controller Interface (xHCI), e.g., in accordance with the USB 3.0 Specification.

According to this example, the combination of PAL communication unit 130, network interface 110, network interface 120, and PAL communication unit 131 may be configured to replace and/or emulate the USB physical cable for connecting between a host device, e.g., device 102, and a peripheral device, e.g., a USB device, for example, included by or connected to device 104.

In some demonstrative embodiments, PAL communication unit 130 and/or PAL communication unit 131 may be configured to enable bus specific functions, e.g., a reset function, for example, in a media agnostic USB (MA-USB), e.g., which may configured to replace the USB cable for connecting between devices 102 and 104.

In some demonstrative embodiments, in media agnostic USB, there may exist a PAL session, e.g., a wireless session, between PAL communication unit 130 and PAL communication unit 131, e.g., in addition to a USB specified session between the USB host logic of device 102 and every USB device under control of the USB host logic, e.g., devices 162, 164, 166 and/or 168.

In some demonstrative embodiments, PAL communication unit 130 may communicate with PAL communication unit 131 during a session ("MA-USB session" or "WSE session") between the MA-USB device and MA-USB host.

In some demonstrative embodiments, PAL communication unit 130 may perform host functions specific to media agnostic USB including, for example, creating PAL messages and interfaces with lower layers, e.g., transport, data link, and/or MAC layers. PAL communication unit 131 may be a counterpart of PAL communication unit 130, and may, for example, manage the interactions with the USB devices, e.g., which may be "behind" PAL communication unit 131.

In some demonstrative embodiments, a USB host, e.g., device 102, may request and/or cause a peripheral device, for example, a USB device ("the reset USB device"), of peripheral devices 162, 164, 166 and/or 168 to transition to a default state. The operation of transitioning a USB device to a default state may also be referred to as "resetting" the USB device.

In some demonstrative embodiments, the controller 141 to which the reset USB device is connected may perform one or more actions, in response to resetting the USB device, e.g., to clear one or more states related to the reset USB device. For example, controller 141 may reset a port to which the reset USB device is connected, e.g., if controller 141 performs the functionality of an xHCI.

In some demonstrative embodiments, PAL communication unit 130 and PAL communication unit 131 may be configured to enable PAL 131 to realize that the USB device is reset and consequently take any required actions, e.g., as described below.

In some demonstrative embodiments, control transfers, e.g., USB control transfers, for resetting the USB device may be transferred between USBDI 137 and the USB device as payload of data PAL messages, e.g., USB PAL messages, communicated between PAL communication units 130 and 131.

In some demonstrative embodiments, it may not be efficient to configure PAL communication unit 131 to learn about the USB device reset, for example, by examining the control transfers, e.g., the USB control transfers, that are tunneled as data packets between PAL communication unit 130 and PAL communication unit 131.

For example, examining the USB control transfers, e.g., in order to find commands for resetting the USB device, may incur, for example, high overhead, may increase latency and/or may increase complexity of device PAL 131.

In some demonstrative embodiments, PAL communication unit 130 may be configured to indicate to PAL communication unit 131 the transitioning of a peripheral device, e.g., a device of devices 162, 164, 166 and/or 168, e.g., as described below.

In some demonstrative embodiments, PAL communication unit 130 may be configured to explicitly communicate to PAL communication unit 131 a message ("reset message") indicating transitioning of a USB device associated with device 104 e.g., a USB device controlled by controller 141, to the default state.

In some demonstrative embodiments, explicitly communicating to PAL communication unit 131 the indication of the transitioning of the USB to the default state may, for example, reduce the complexity associated with the process for PAL communication unit 131 to learn about the resetting of the USB device.

In some demonstrative embodiments, based on the reset message, PAL communication unit 131 may learn that the USB device is being reset and may cause the host controller 141 in charge of the USB device to issue the port reset and/or take other actions required to complete the USB device reset process by the USB host controller 141.

In some demonstrative embodiments, PAL communication unit 130 may transmit to PAL communication unit 131 a device reset request indicating the transitioning of a peripheral device, e.g., a device of devices 162, 164, 166 and 168, to a default state.

In some demonstrative embodiments, PAL communication unit 130 may transmit the device reset request subsequent to transition of the peripheral device to the default state, e.g., as described below.

In some demonstrative embodiments, PAL communication unit 130 may transmit the device reset request subsequent to communication of a PAL data message over communication link 103. For example, the PAL message may include a payload including a request command, e.g., a USB command, to transition the peripheral device to the default state.

In some demonstrative embodiments, the PAL message may include a control transfer request identifying the peripheral device, which is transitioned to the default state.

In some demonstrative embodiments, PAL communication unit 130 may transmit the device reset request subsequent to communication of a control transfer response over communication link 103. For example, the control transfer response may be communicated in response to the control transfer request, e.g., as described below.

In some demonstrative embodiments, the peripheral device may include a USB device, e.g., as described above. According to these embodiments, PAL communication unit 130 may transmit a USB device Reset Request Packet to PAL communication unit 131.

In some demonstrative embodiments, the device reset request may include an identifier of the peripheral device transitioned to the default state.

In one example, the USB device Reset Request Packet may include a Device Handle filed including a handle of the USB device the USB device Reset Request Packet is targeting.

For example, PAL communication unit 130 may transmit to PAL communication unit 131 a USB device Reset Request Packet including a handle of peripheral device 162, e.g., to indicate to PAL communication unit 131 that peripheral device 162 is transitioned to the default state.

In some demonstrative embodiments, PAL communication unit 131 may notify controller 141 of the peripheral device about the transition of the peripheral device to the default state, e.g., based on the device reset request.

In some demonstrative embodiments, controller 141 may perform one or more reset actions based on the indication from PAL communication unit 131. For example, controller 141 may initiate a USB Reset Device command, e.g., if controller 141 performs the functionality of an xHCI, and/or any other action and/or command.

In some demonstrative embodiments, PAL communication unit 131 may transmit to PAL communication unit 130 a device reset response over communication link 103, e.g., in response to the device reset request.

In some demonstrative embodiments, the device reset response may indicate whether the device reset request is successfully handled, e.g., as described below.

In some demonstrative embodiments, the peripheral device may include a USB device, e.g., as described above. According to these embodiments, PAL communication unit 131 may transmit a USB device Reset Response Packet to PAL communication unit 131, e.g., in response to the USB device Reset Request Packet.

In some demonstrative embodiments, the device reset response may include an identifier of the peripheral device transitioned to the default state.

In one example, the USB device Reset Response Packet may include a Device Handle filed including the handle of the USB device to which the USB device Reset Response Packet corresponds.

In some demonstrative embodiments, the device reset response may include a status code field to indicate whether the device reset request is successfully handled.

For example, PAL communication unit 131 may transmit to PAL communication unit 130 a USB device Reset Response Packet including a handle of peripheral device 162 and a status code field having a first predefined value to indicate to PAL communication unit 130 that the device reset request is successfully handled, or a second predefined value to indicate to PAL communication unit 130 that the device reset request is not successfully handled.

In some demonstrative embodiments, the device reset request and/or the device reset response may be communicated as management packets.

In some demonstrative embodiments, the transitioning of the peripheral device to the default state may result in an updated identifier of the peripheral device.

For example, the transitioning of a USB device to the default state may result in a USB device address of the USB device being reset, e.g., to zero.

In some demonstrative embodiments, an EP handle of an EP, which is associated with a peripheral device, may be determined based on an address of the peripheral device. For example, an EP handle of EP 134 may be based on an address of device 162.

Accordingly, the EP handle of the EP, which is associated with the reset peripheral device, may be modified as a result of transitioning the peripheral device to the default state.

In some demonstrative embodiments, PAL communication unit 131 may be configured to inform PAL communication unit 130 about the modified EP handle, e.g., as described below.

In some demonstrative embodiments, PAL communication unit 130 may be capable of explicitly determining the updated identifier of the peripheral device, e.g., based on the information from PAL communication unit 131.

In other demonstrative embodiments, PAL communication unit 130 may be capable of implicitly determining the updated identifier of the peripheral device, e.g., even without receiving information from PAL communication unit 131.

In some demonstrative embodiments, PAL communication unit 130 may transmit to PAL communication unit 131 a handle request message, e.g., subsequent to communication of the device reset response.

In some demonstrative embodiments, PAL communication unit 131 may determine the updated EP handle, e.g., based on the updated USB device address of the reset USB device.

In some demonstrative embodiments, PAL communication unit 131 may transmit to PAL communication unit 130 a handle response message including the updated EP handle, e.g., in response to the handle request message.

In one example, the handle request message may include a "Modify EP0 request packet" and/or the handle response message may include a "Modify EP0 Response packet" including a modified "EP0 handle" of the EP of the reset USB device.

Figure 2:
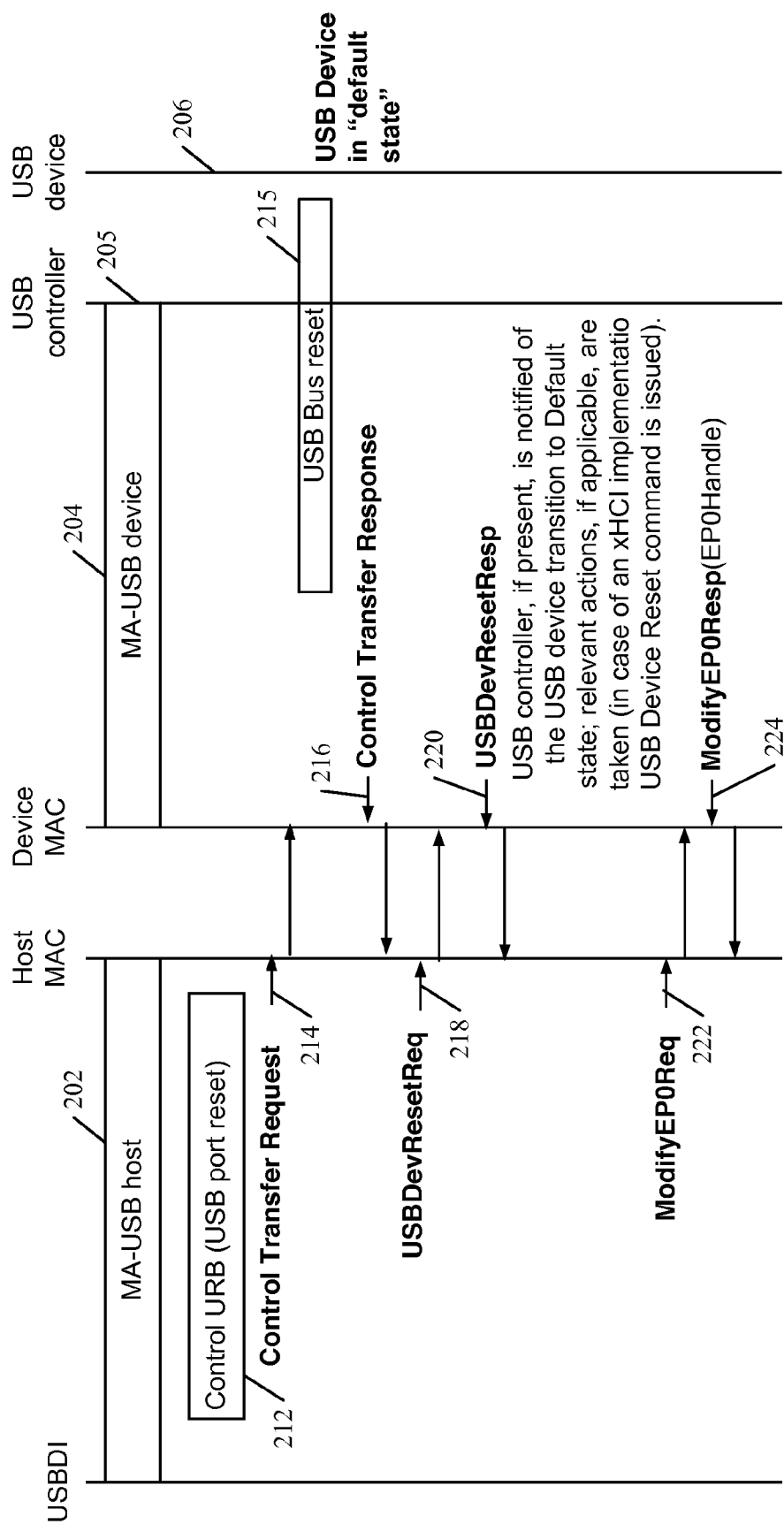
FIG. 2 is a schematic illustration of a sequence of communications between first and second Protocol Adaptation Layer (PAL) communication units, in accordance with some demonstrative embodiments.

Reference is made to FIG. 2, which schematically illustrates a sequence of communications between a MA-USB host 202, a MA-USB device 204 and a USB device 206, in accordance with some demonstrative embodiments. For example, PAL communication unit 130 (FIG. 1) may perform the functionality of MA-USB host 202, PAL communication unit 131 (FIG. 1) may perform the functionality of MA-USB device 204, and/or devices 162, 164, 166 and/or 168 (FIG. 1) may perform the functionality of USB device 206.

In some demonstrative embodiments, removal of USB device 206 may be initiated, for example, by a USB host system software associated with a USBDI 210.

For example, the USB host system software may provide to MA-USB host 202 a control USB Request Block (URB) including a request 212, e.g., a USB port reset request, to reset USB device 206.

In some demonstrative embodiments, MA-USB host 202 may transmit a first PAL data packet to MA-USB device 204, e.g., in response to receiving the URB request 212. The first PAL data packet may include a payload including a USB control transfer request 214 to indicate that USB device 206 is to be transitioned to the default state. A USB Bus reset operation 215 may be initiated by USB device 206 based on the USB control transfer request 214, and USB device 206 may transition to the default state.

In some demonstrative embodiments, MA-USB device 204 may transmit a second PAL data packet to MA-USB host 202, e.g., subsequent to USB device 206 transitioning to the default state. The second PAL data packet may include a payload including a USB control transfer response 216 from USB device 206 to indicate that USB device 206 has been transitioned to the default state.

As discussed above, the first and second PAL data packets may not explicitly and/or directly indicate to MA-USB device 204 the transitioning of USB device 206 to the default state, e.g., since the USB control transfer request 214 may be tunneled as a payload of the first PAL data packet and/or the USB control transfer response 216 may be tunneled as a payload of the second PAL data packet.

In some demonstrative embodiments, MA-USB host 202 may transmit a USB Device Reset Request ("USBDevResetReq") packet 218 to MA-USB device 204, for example, following the transition of USB device 216 to the default state, e.g., subsequent to communication of USB control transfer response 216. USB Device Reset Request packet 218 may include, for example, an identifier, e.g., a handle, of USB device 206, e.g., as described above.

In some demonstrative embodiments, USB device may be connected to a physical USB controller 205 implemented by MA-USB device 204, e.g., as described above. According to these embodiments, MA-USB device 204 may use the USB Device Reset Request packet 218 to inform USB controller 205 of the transition of USB device 206 to the default state. The USB Device Reset Request packet 218 may trigger one or more applicable actions, for example, to trigger USB controller 205 to initiate a USB Reset Device command, e.g., if USB controller 205 performs the functionality of an xHCI.

In other embodiments, MA-USB device 204 may not implement a physical USB controller. According to these embodiments, the USBDevResetReq packet 218 may result in other operations or in no additional operation by MA-USB device 204, e.g., with respect to USB device 206.

In some demonstrative embodiments, MA-USB device 204 may transmit to MA-USB host 202 a USB Device Reset Response packet ("USBDEVResetResp") 220, e.g., in response to USB Device Reset Request packet 218. USB Device Reset Response packet 220 may include, for example, an identifier, e.g., a handle, of USB device 206, e.g., as described above. USB Device Reset Response packet 220 may also include, for example, an indication of whether the USB Reset Request was successfully handled, e.g., as described above.

In some demonstrative embodiments, the USB device address of USB device 206 may be modified, e.g., set to zero, for example, when USB device 206 is transitioned to the default state. Accordingly, a handle, e.g., an EP0 handle, for USB device 206 may be modified, e.g., since the EP0 handle of USB device 206 may be based on the USB device address of USB device 206.

In some demonstrative embodiments, MA-USB host 202 may transmit to MA-USB device 204 a request 222 to receive the updated EP0 Handle for USB device 206, e.g., following the communication of Device Reset Response packet 220.

For example, request 222 may be communicated in the form of a Modify EP0 Request packet.

In some demonstrative embodiments, MA-USB device 204 may transmit to MA-USB host a response packet 224 including the modified handle of USB device 206, e.g., in response to request 222. For example, response packet 224 may include a Modify EP0 Response packet including the modified EP0 handle of USB device 206.

Figure 3:
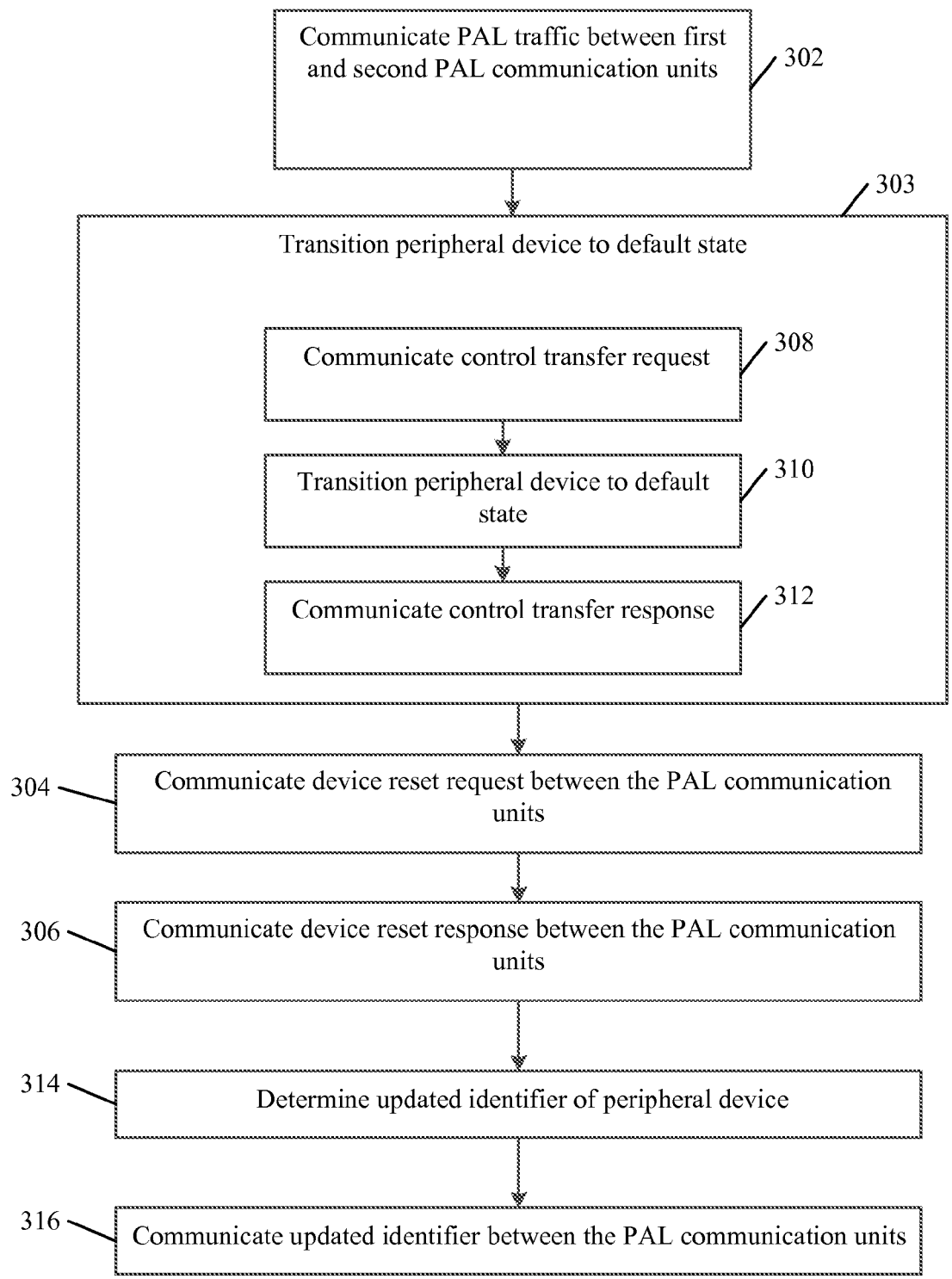
FIG. 3 is a schematic flow-chart illustration of a method of transitioning a device to a default state, in accordance with some demonstrative embodiments.

Reference is made to FIG. 3, which schematically illustrates a method of transitioning a device to a default state, in accordance with some demonstrative embodiments. In some embodiments, one or more of the operations of the method of FIG. 3 may be performed by a system, e.g., system 100 (FIG. 1); a device, e.g., device 102 (FIG. 1) and/or device 104 (FIG. 1); a PAL communication unit, e.g., PAL communication unit 130 (FIG. 1) and/or PAL communication unit 131 (FIG. 1); a MA-USB host, e.g., MA-USB host 202 (FIG. 2); and/or a MA-USB device, e.g., MA-USB device 204 (FIG. 2).

As indicated at block 302, the method may include communicating PAL traffic between a first PAL communication unit and a second PAL communication unit over a communication link, the PAL traffic including traffic of a PAL connection over a PAL. For example, PAL communication units 130 and 131 (FIG. 1) may communicate PAL traffic over communication link 103, e.g., as described above.

As indicated at block 304, the method may include communicating a device reset request between the first and second PAL communication units over the communication link. The device reset request may indicate transitioning of a peripheral device to a default state. For example, PAL communication unit 130 (FIG. 1) may transmit the device reset request to PAL communication unit 131 (FIG. 1) over link 103 (FIG. 1), e.g., as described above.

As indicated at block 306, the method may include communicating a device reset response between the first and second PAL communication units over the communication link. For example, the device reset response may be communicated in response to the device reset request. The device reset response may indicate whether the device reset request is successfully handled. For example, PAL communication unit 131 (FIG. 1) may transmit the device reset response to PAL communication unit 130 (FIG. 1) over link 103 (FIG. 1), e.g., as described above.

As indicated at block 303, in some demonstrative embodiments, the method may include communicating the device reset request subsequent to transition of the peripheral device to the default state, e.g., as described below.

As indicated at block 308, the method may include communicating a PAL data message over the communication link, the PAL data message including a request to transition the peripheral device to the default state. For example, MA-USB host 202 (FIG. 2) may transmit to MA-USB device 204 (FIG. 2) the Control Transfer Request 214 (FIG. 2) identifying USB device 206 (FIG. 2), e.g., as described above.

As indicated at block 310, the method may include transitioning the peripheral device to the default state, e.g., based on the PAL data message. For example, USB device 206 (FIG. 2) may transition to the default state based on the Control Transfer Request 214 (FIG. 2) identifying USB device 206 (FIG. 2), e.g., as described above.

As indicated at block 312, the method may include communicating a PAL data message including a response over the communication link, e.g., in response to the request of the PAL data message. For example, MA-USB device 204 (FIG. 2) may transmit to MA-USB host 202 (FIG. 2) the Control Transfer Response 216 (FIG. 2), e.g., as described above.

As shown in FIG. 3, in some demonstrative embodiments the method may include communicating the device reset request subsequent to the communication of the PAL data messages including the control request and control response.

In some demonstrative embodiments, the method may include notifying a device controller of the peripheral device about the transition of the peripheral device to the default state. For example, MA-USB device 204 (FIG. 2) may inform USB controller 205 (FIG. 2) of the transition of USB device 206 (FIG. 2) to the default state, e.g., as described above.

As indicated at block 314, the method may include determining an updated identifier of the peripheral device, e.g., subsequent to the transition of the peripheral device to the default state. For example, MA-USB host 202 (FIG. 2) may determine a modified EP handle of USB device 206 (FIG. 1), e.g., as described above.

As indicated at block 316, the method may include communicating between the first and second PAL communication units a message including the updated identifier of the peripheral device. For example, MA-USB device 204 (FIG. 2) may transmit response 224 (FIG. 2) to MA-USB host 202 (FIG. 2), e.g., in response to request 222 (FIG. 2), as described above.

Figure 4:
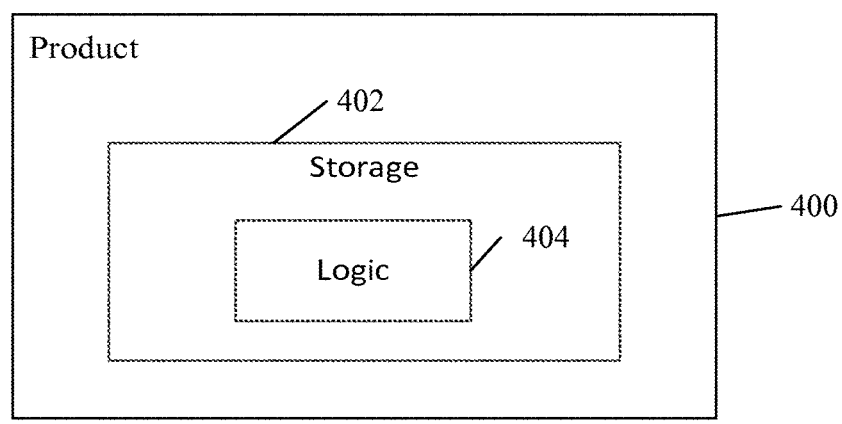
FIG. 4 is a schematic illustration of a product, in accordance with some demonstrative embodiments.

Reference is made to FIG. 4, which schematically illustrates a product of manufacture 400, in accordance with some demonstrative embodiments. Product 400 may include a non-transitory machine-readable storage medium 402 to store logic 404, which may be used, for example, to perform at least part of the functionality of device 102 (FIG. 1), device 104 (FIG. 1), PAL communication unit 130 (FIG. 1), PAL communication unit 131 (FIG. 1), MA-USB host 202 (FIG. 2), and/or MA-USB device 204 (FIG. 2), to perform one or more of the operations of the sequence of FIG. 2, and/or to perform one or more operations of the method of FIG. 3. The phrase "non-transitory machine-readable medium" is directed to include all computer-readable media, with the sole exception being a transitory propagating signal.

In some demonstrative embodiments, product 400 and/or machine-readable storage medium 402 may include one or more types of computer-readable storage media capable of storing data, including volatile memory, non-volatile memory, removable or non-removable memory, erasable or non-erasable memory, writeable or re-writeable memory, and the like. For example, machine-readable storage medium 402 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 404 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 404 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising a first Protocol Adaptation Layer (PAL) communication unit to communicate PAL traffic with a second PAL communication unit over a communication link, the PAL traffic comprising traffic of a PAL connection over a PAL, the PAL is above a layer of the communication link, wherein the first PAL communication unit is to communicate a device reset request and a device reset response with the second PAL communication unit over the communication link, the device reset request indicating transitioning of a peripheral device to a default state, the device reset response in response to the device reset request, the device reset response indicating whether the device reset request is successfully handled.

Example 2 includes the subject matter of Example 1 and optionally, wherein the first PAL communication unit is to communicate the device reset request subsequent to transition of the peripheral device to the default state.

Example 3 includes the subject matter of Example 1 or 2 and optionally, wherein the first PAL communication unit is to communicate the device reset request subsequent to communication of a PAL data message over the communication link, the PAL data message including a request to transition the peripheral device to the default state.

Example 4 includes the subject matter of Example 3 and optionally, wherein the PAL data message comprises a control transfer request identifying the peripheral device.

Example 5 includes the subject matter of Example 4 and optionally, wherein the first PAL communication unit is to communicate the device reset request subsequent to communication of a control transfer response over the communication link, the control transfer response in response to the control transfer request.

Example 6 includes the subject matter of any one of Examples 1-5 and optionally, wherein the first PAL communication unit is to transmit the device reset request and to receive the device reset response.

Example 7 includes the subject matter of Example 6 and optionally, wherein the transitioning of the peripheral device to the default state is to result in an updated identifier of the peripheral device, and wherein the first PAL communication unit is to determine the updated identifier of the peripheral device.

Example 8 includes the subject matter of Example 6 or 7 and optionally, wherein the first PAL communication unit comprises a PAL host.

Example 9 includes the subject matter of Example 8 and optionally, wherein the PAL host comprises a Wireless-Gigabit (WiGig) Serial Extension (WSE) host, a Wireless-Fidelity (Wi-Fi) Serial Bus (WSB) host, or a Media Agnostic Universal-Serial-Bus (MA USB) host.

Example 10 includes the subject matter of any one of Examples 1-5 and optionally, wherein the first PAL communication unit is to receive the device reset request and to transmit the device reset response.

Example 11 includes the subject matter of Example 10 and optionally, wherein the first PAL communication unit is to notify a device controller of the peripheral device about the transition of the peripheral device to the default state.

Example 12 includes the subject matter of Example 11 and optionally, wherein the peripheral device comprises a Universal-Serial-Bus (USB) device and the device controller comprises a USB controller.

Example 13 includes the subject matter of any one of Examples 10-12 and optionally, wherein the first PAL communication unit comprises a PAL device.

Example 14 includes the subject matter of Example 13 and optionally, wherein the PAL device comprises a Wireless-Gigabit (WiGig) Serial Extension (WSE) device, a Wireless Fidelity (Wi-Fi) Serial Bus (WSB) device, or a Media Agnostic Universal-Serial-Bus (MA USB) device.

Example 15 includes the subject matter of any one of Examples 1-14 and optionally, wherein the transitioning of the peripheral device to the default state is to result in an updated identifier of the peripheral device, and wherein the first PAL communication unit is to communicate with the second PAL communication unit a message including the updated identifier of the peripheral device.

Example 16 includes the subject matter of Example 15 and optionally, wherein the updated identifier comprises an updated handle, the first PAL communication unit is to communicate with the second PAL communication unit a handle request message followed by a handle response message including the updated handle.

Example 17 includes the subject matter of any one of Examples 1-16 and optionally, wherein the first peripheral device comprises a Universal-Serial-Bus (USB) device.

Example 18 includes the subject matter of any one of Examples 1-17 and optionally, wherein the communication link comprises a MAC layer link or an Internet-Protocol (IP) link.

Example 19 includes the subject matter of Example 18 and optionally, wherein the MAC layer link comprises a wireless communication link.

Example 20 includes the subject matter of Example 19 and optionally, wherein the wireless communication link comprises a wireless gigabit (WiGig) link or a Wireless Fidelity (Wi-Fi) link.

Example 21 includes system comprising at least one communication device including a network interface to communicate over a communication link; and a first Protocol Adaptation Layer (PAL) communication unit to communicate PAL traffic with a second PAL communication unit over the communication link, the PAL traffic comprising traffic of a PAL connection over a PAL, the PAL is above a layer of the communication link, wherein the first PAL communication unit is to communicate a device reset request and a device reset response with the second PAL communication unit over the communication link, the device reset request indicating transitioning of a peripheral device to a default state, the device reset response in response to the device reset request, the device reset response indicating whether the device reset request is successfully handled.

Example 22 includes the subject matter of Example 21 and optionally, wherein the first PAL communication unit is to communicate the device reset request subsequent to transition of the peripheral device to the default state.

Example 23 includes the subject matter of Example 21 or 22 and optionally, wherein the first PAL communication unit is to communicate the device reset request subsequent to communication of a PAL data message over the communication link, the PAL data message including a request to transition the peripheral device to the default state.

Example 24 includes the subject matter of Example 23 and optionally, wherein the PAL data message comprises a control transfer request identifying the peripheral device.

Example 25 includes the subject matter of Example 24 and optionally, wherein the first PAL communication unit is to communicate the device reset request subsequent to communication of a control transfer response over the communication link, the control transfer response in response to the control transfer request.

Example 26 includes the subject matter of any one of Examples 21-25 and optionally, wherein the first PAL communication unit is to transmit the device reset request and to receive the device reset response.

Example 27 includes the subject matter of Example 26 and optionally, wherein the transitioning of the peripheral device to the default state is to result in an updated identifier of the peripheral device, and wherein the first PAL communication unit is to determine the updated identifier of the peripheral device.

Example 28 includes the subject matter of Example 26 or 27 and optionally, wherein the first PAL communication unit comprises a PAL host.

Example 29 includes the subject matter of Example 28 and optionally, wherein the PAL host comprises a Wireless-Gigabit (WiGig) Serial Extension (WSE) host, a Wireless-Fidelity (Wi-Fi) Serial Bus (WSB) host, or a Media Agnostic Universal-Serial-Bus (MA USB) host.

Example 30 includes the subject matter of any one of Examples 21-25 and optionally, wherein the first PAL communication unit is to receive the device reset request and to transmit the device reset response.

Example 31 includes the subject matter of Example 30 and optionally, wherein the first PAL communication unit is to notify a device controller of the peripheral device about the transition of the peripheral device to the default state.

Example 32 includes the subject matter of Example 31 and optionally, wherein the peripheral device comprises a Universal-Serial-Bus (USB) device and the device controller comprises a USB controller.

Example 33 includes the subject matter of any one of Examples 30-32 and optionally, wherein the first PAL communication unit comprises a PAL device.

Example 34 includes the subject matter of Example 33 and optionally, wherein the PAL device comprises a Wireless-Gigabit (WiGig) Serial Extension (WSE) device, a Wireless Fidelity (Wi-Fi) Serial Bus (WSB) device, or a Media Agnostic Universal-Serial-Bus (MA USB) device.

Example 35 includes the subject matter of any one of Examples 21-34 and optionally, wherein the transitioning of the peripheral device to the default state is to result in an updated identifier of the peripheral device, and wherein the first PAL communication unit is to communicate with the second PAL communication unit a message including the updated identifier of the peripheral device.

Example 36 includes the subject matter of Example 35 and optionally, wherein the updated identifier comprises an updated handle, the first PAL communication unit is to communicate with the second PAL communication unit a handle request message followed by a handle response message including the updated handle.

Example 37 includes the subject matter of any one of Examples 21-36 and optionally, wherein the first peripheral device comprises a Universal-Serial-Bus (USB) device.

Example 38 includes the subject matter of any one of Examples 21-37 and optionally, wherein the communication link comprises a MAC layer link or an Internet-Protocol (IP) link.

Example 39 includes the subject matter of Example 38 and optionally, wherein the MAC layer link comprises a wireless communication link.

Example 40 includes the subject matter of Example 39 and optionally, wherein the wireless communication link comprises a wireless gigabit (WiGig) link or a Wireless Fidelity (Wi-Fi) link.

Example 41 includes a method comprising communicating Protocol Adaptation Layer (PAL) traffic between a first PAL communication unit and a second PAL communication unit over a communication link, the PAL traffic comprising traffic of a PAL connection over a PAL, the PAL is above a layer of the communication link; and communicating a device reset request and a device reset response between the first and second PAL communication units over the communication link, the device reset request indicating transitioning of a peripheral device to a default state, the device reset response in response to the device reset request, the device reset response indicating whether the device reset request is successfully handled.

Example 42 includes the subject matter of Example 41 and optionally, comprising communicating the device reset request subsequent to transition of the peripheral device to the default state.

Example 43 includes the subject matter of Example 41 or 42 and optionally, comprising communicating the device reset request subsequent to communication of a PAL data message over the communication link, the PAL data message including a request to transition the peripheral device to the default state.

Example 44 includes the subject matter of Example 43 and optionally, wherein the PAL data message comprises a control transfer request identifying the peripheral device.

Example 45 includes the subject matter of Example 44 and optionally, comprising communicating the device reset request subsequent to communication of a control transfer response over the communication link, the control transfer response in response to the control transfer request.

Example 46 includes the subject matter of any one of Examples 41-45 and optionally, comprising transmitting the device reset request and receiving the device reset response.

Example 47 includes the subject matter of Example 46 and optionally, wherein the transitioning of the peripheral device to the default state is to result in an updated identifier of the peripheral device, the method comprising determining the updated identifier of the peripheral device.

Example 48 includes the subject matter of Example 46 or 47 and optionally, wherein the first PAL communication unit comprises a PAL host.

Example 49 includes the subject matter of Example 48 and optionally, wherein the PAL host comprises a Wireless-Gigabit (WiGig) Serial Extension (WSE) host, a Wireless-Fidelity (Wi-Fi) Serial Bus (WSB) host, or a Media Agnostic Universal-Serial-Bus (MA USB) host.

Example 50 includes the subject matter of any one of Examples 41-45 and optionally, comprising receiving the device reset request and transmitting the device reset response.

Example 51 includes the subject matter of Example 50 and optionally, comprising notifying a device controller of the peripheral device about the transition of the peripheral device to the default state.

Example 52 includes the subject matter of Example 51 and optionally, wherein the peripheral device comprises a Universal-Serial-Bus (USB) device and the device controller comprises a USB controller.

Example 53 includes the subject matter of any one of Examples 50-52 and optionally, wherein the first PAL communication unit comprises a PAL device.

Example 54 includes the subject matter of Example 53 and optionally, wherein the PAL device comprises a Wireless-Gigabit (WiGig) Serial Extension (WSE) device, a Wireless Fidelity (Wi-Fi) Serial Bus (WSB) device, or a Media Agnostic Universal-Serial-Bus (MA USB) device.

Example 55 includes the subject matter of any one of Examples 41-54 and optionally, wherein the transitioning of the peripheral device to the default state is to result in an updated identifier of the peripheral device, the method comprises communicating between the first and second PAL communication units a message including the updated identifier of the peripheral device.

Example 56 includes the subject matter of Example 55 and optionally, wherein the updated identifier comprises an updated handle, the method comprising communicating between the first PAL communication unit and the second PAL communication unit a handle request message followed by a handle response message including the updated handle.

Example 57 includes the subject matter of any one of Examples 41-56 and optionally, wherein the first peripheral device comprises a Universal-Serial-Bus (USB) device.

Example 58 includes the subject matter of any one of Examples 41-57 and optionally, wherein the communication link comprises a MAC layer link or an Internet-Protocol (IP) link.

Example 59 includes the subject matter of Example 58 and optionally, wherein the MAC layer link comprises a wireless communication link.

Example 60 includes the subject matter of Example 59 and optionally, wherein the wireless communication link comprises a wireless gigabit (WiGig) link or a Wireless Fidelity (Wi-Fi) link.

Example 61 includes a product including a non-transitory storage medium having stored thereon instructions that, when executed by a machine, result in communicating Protocol Adaptation Layer (PAL) traffic between a first PAL communication unit and a second PAL communication unit over a communication link, the PAL traffic comprising traffic of a PAL connection over a PAL, the PAL is above a layer of the communication link; and communicating a device reset request and a device reset response between the first and second PAL communication units over the communication link, the device reset request indicating transitioning of a peripheral device to a default state, the device reset response in response to the device reset request, the device reset response indicating whether the device reset request is successfully handled.

Example 62 includes the subject matter of Example 61 and optionally, wherein the instructions result in communicating the device reset request subsequent to transition of the peripheral device to the default state.

Example 63 includes the subject matter of Example 61 or 62 and optionally, wherein the instructions result in communicating the device reset request subsequent to communication of a PAL data message over the communication link, the PAL data message including a request to transition the peripheral device to the default state.

Example 64 includes the subject matter of Example 63 and optionally, wherein the PAL data message comprises a control transfer request identifying the peripheral device.

Example 65 includes the subject matter of Example 64 and optionally, wherein the instructions result in communicating the device reset request subsequent to communication of a control transfer response over the communication link, the control transfer response in response to the control transfer request.

Example 66 includes the subject matter of any one of Examples 61-65 and optionally, wherein the instructions result in transmitting the device reset request and receiving the device reset response.

Example 67 includes the subject matter of Example 66 and optionally, wherein the transitioning of the peripheral device to the default state is to result in an updated identifier of the peripheral device, and wherein the instructions result in determining the updated identifier of the peripheral device.

Example 68 includes the subject matter of Example 66 or 67 and optionally, wherein the first PAL communication unit comprises a PAL host.

Example 69 includes the subject matter of Example 68 and optionally, wherein the PAL host comprises a Wireless-Gigabit (WiGig) Serial Extension (WSE) host, a Wireless-Fidelity (Wi-Fi) Serial Bus (WSB) host, or a Media Agnostic Universal-Serial-Bus (MA USB) host.

Example 70 includes the subject matter of any one of Examples 61-65 and optionally, wherein the instructions result in receiving the device reset request and transmitting the device reset response.

Example 71 includes the subject matter of Example 70 and optionally, wherein the instructions result in notifying a device controller of the peripheral device about the transition of the peripheral device to the default state.

Example 72 includes the subject matter of Example 71 and optionally, wherein the peripheral device comprises a Universal-Serial-Bus (USB) device and the device controller comprises a USB controller.

Example 73 includes the subject matter of any one of Examples 70-72 and optionally, wherein the first PAL communication unit comprises a PAL device.

Example 74 includes the subject matter of Example 73 and optionally, wherein the PAL device comprises a Wireless-Gigabit (WiGig) Serial Extension (WSE) device, a Wireless Fidelity (Wi-Fi) Serial Bus (WSB) device, or a Media Agnostic Universal-Serial-Bus (MA USB) device.

Example 75 includes the subject matter of any one of Examples 61-74 and optionally, wherein the transitioning of the peripheral device to the default state is to result in an updated identifier of the peripheral device, and wherein the instructions result in communicating between the first and second PAL communication units a message including the updated identifier of the peripheral device.

Example 76 includes the subject matter of Example 75 and optionally, wherein the updated identifier comprises an updated handle, and wherein the instructions result in communicating between the first PAL communication unit and the second PAL communication unit a handle request message followed by a handle response message including the updated handle.

Example 77 includes the subject matter of any one of Examples 61-76 and optionally, wherein the first peripheral device comprises a Universal-Serial-Bus (USB) device.

Example 78 includes the subject matter of any one of Examples 61-77 and optionally, wherein the communication link comprises a MAC layer link or an Internet-Protocol (IP) link.

Example 79 includes the subject matter of Example 78 and optionally, wherein the MAC layer link comprises a wireless communication link.

Example 80 includes the subject matter of Example 79 and optionally, wherein the wireless communication link comprises a wireless gigabit (WiGig) link or a Wireless Fidelity (Wi-Fi) link.

Example 81 includes an apparatus comprising means for communicating Protocol Adaptation Layer (PAL) traffic between a first PAL communication unit and a second PAL communication unit over a communication link, the PAL traffic comprising traffic of a PAL connection over a PAL, the PAL is above a layer of the communication link; and means for communicating a device reset request and a device reset response between the first and second PAL communication units over the communication link, the device reset request indicating transitioning of a peripheral device to a default state, the device reset response in response to the device reset request, the device reset response indicating whether the device reset request is successfully handled.

Example 82 includes the subject matter of Example 81 and optionally, comprising means for communicating the device reset request subsequent to transition of the peripheral device to the default state.

Example 83 includes the subject matter of Example 81 or 82 and optionally, comprising means for communicating the device reset request subsequent to communication of a PAL data message over the communication link, the PAL data message including a request to transition the peripheral device to the default state.

Example 84 includes the subject matter of Example 83 and optionally, wherein the PAL data message comprises a control transfer request identifying the peripheral device.

Example 85 includes the subject matter of Example 84 and optionally, comprising means for communicating the device reset request subsequent to communication of a control transfer response over the communication link, the control transfer response in response to the control transfer request.

Example 86 includes the subject matter of any one of Examples 81-85 and optionally, comprising means for transmitting the device reset request and receiving the device reset response.

Example 87 includes the subject matter of Example 86 and optionally, wherein the transitioning of the peripheral device to the default state is to result in an updated identifier of the peripheral device, the apparatus comprising means for determining the updated identifier of the peripheral device.

Example 88 includes the subject matter of Example 86 or 77 and optionally, wherein the first PAL communication unit comprises a PAL host.

Example 89 includes the subject matter of Example 88 and optionally, wherein the PAL host comprises a Wireless-Gigabit (WiGig) Serial Extension (WSE) host, a Wireless-Fidelity (Wi-Fi) Serial Bus (WSB) host, or a Media Agnostic Universal-Serial-Bus (MA USB) host.

Example 90 includes the subject matter of any one of Examples 81-85 and optionally, comprising means for receiving the device reset request and transmitting the device reset response.

Example 91 includes the subject matter of Example 90 and optionally, comprising men's for notifying a device controller of the peripheral device about the transition of the peripheral device to the default state.

Example 92 includes the subject matter of Example 91 and optionally, wherein the peripheral device comprises a Universal-Serial-Bus (USB) device and the device controller comprises a USB controller.

Example 93 includes the subject matter of any one of Examples 90-92 and optionally, wherein the first PAL communication unit comprises a PAL device.

Example 94 includes the subject matter of Example 93 and optionally, wherein the PAL device comprises a Wireless-Gigabit (WiGig) Serial Extension (WSE) device, a Wireless Fidelity (Wi-Fi) Serial Bus (WSB) device, or a Media Agnostic Universal-Serial-Bus (MA USB) device.

Example 95 includes the subject matter of any one of Examples 81-94 and optionally, wherein the transitioning of the peripheral device to the default state is to result in an updated identifier of the peripheral device, the apparatus comprises means for communicating between the first and second PAL communication units a message including the updated identifier of the peripheral device.

Example 96 includes the subject matter of Example 95 and optionally, wherein the updated identifier comprises an updated handle, the apparatus comprising means for communicating between the first PAL communication unit and the second PAL communication unit a handle request message followed by a handle response message including the updated handle.

Example 97 includes the subject matter of any one of Examples 81-96 and optionally, wherein the first peripheral device comprises a Universal-Serial-Bus (USB) device.

Example 98 includes the subject matter of any one of Examples 81-97 and optionally, wherein the communication link comprises a MAC layer link or an Internet-Protocol (IP) link.

Example 99 includes the subject matter of Example 98 and optionally, wherein the MAC layer link comprises a wireless communication link.

Example 100 includes the subject matter of Example 99 and optionally, wherein the wireless communication link comprises a wireless gigabit (WiGig) link or a Wireless Fidelity (Wi-Fi) link.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many variations, modifications, substitutions, changes, additions, improvements and equivalents may occur to those skilled in the art. It is, therefore, to be understood that the appended claims are intended to cover all such modifications and changes as fall within the true spirit of the invention.

What is claimed is:

1. An apparatus comprising:
   a communication unit; and
   a processor configured to cause a media-agnostic (MA) Universal Serial Bus (USB) host of an MA USB Protocol Adaptation Layer (PAL) to communicate PAL traffic with an MA USB device over a communication link, said PAL traffic comprising traffic of a PAL connection over said MA USB PAL, said MA USB PAL is above a layer of said communication link, wherein said processor is configured to cause said MA USB host to transmit a USB device reset request to said MA USB device and to process a USB device reset response received from said MA USB device via said communication link, the USB device reset request comprising a handle of a USB device to be transitioned to a default state, the USB device reset response is in response to said USB device reset request, said processor is configured to cause the MA USB host to, when the USB device reset response comprises a status code indicating the USB device reset request is successfully handled, transmit a modify End Point (EP) request to the MA USB device to request for an updated EP handle corresponding to the USB device.

2. The apparatus of claim 1, wherein said processor is configured to cause the MA USB host to process a modify EP response from the MA USB device, the modify EP response comprising the updated EP handle corresponding to the USB device.

3. The apparatus of claim 1, wherein said processor is configured to cause the MA USB host to transmit a control transfer request to the USB device following a control USB Request block (URB) comprising an indication of a USB port reset corresponding to the USB device, and to transmit said USB device reset request subsequent to receipt of a control transfer response from the MA USB device.

4. The apparatus of claim 3, wherein receipt of the control transfer response is after transitioning of the USB device to the default state.

5. The apparatus of claim 1, wherein the USB device reset response comprises the handle of said USB device, and a status code field to indicate whether the USB device reset request is successfully completed.

6. The apparatus of claim 1, wherein said communication unit is to transmit said USB device reset request and to receive said USB device reset response.

7. The apparatus of claim 1 comprising a Media Access Control (MAC) component and a Physical Layer (PHY) component.

8. The apparatus of claim 1, wherein said communication unit comprises a wireless communication unit, the communication link comprising a wireless communication link.

9. The apparatus of claim 1 comprising a radio.

10. The apparatus of claim 1, wherein said communication unit comprises a wired communication unit, the communication link comprising a wired communication link.

11. The apparatus of claim 1 comprising a USB Device Interface (USBDI).

12. The apparatus of claim 1 comprising a memory.

13. The apparatus of claim 1 comprising a mobile device, the mobile device comprising an input unit an output unit, and a storage.

14. The apparatus of claim 1, wherein said communication link comprises a Media Access Control (MAC) layer link or an Internet-Protocol (IP) link.

15. The apparatus of claim 14, wherein said MAC layer link comprises a wireless communication link.

16. The apparatus of claim 15, wherein said wireless communication link comprises a wireless gigabit (WiGig) link or a Wi-Fi link.

17. A system comprising:
at least one communication device including:
a network interface to communicate over a communication link; and
a processor configured to cause a media-agnostic (MA) Universal Serial Bus (USB) device of an MA USB Protocol Adaptation Layer (PAL) to communicate PAL traffic with an MA USB host over said communication link, said PAL traffic comprising traffic of a PAL connection over said MA USB PAL, said MA USB PAL is above a layer of said communication link,
wherein said processor is configured to cause said MA USB device process a USB device reset request from the MA USB host, and to transmit a USB device reset response to said MA USB host over said communication link, the USB device reset request comprising a handle of a USB device to be transitioned to a default state, the USB device reset response is in response to said USB device reset request, the USB device reset response comprising the handle of the USB device, and a success status code field to indicate whether the USB device reset request is successfully completed, said processor is configured to cause the MA USB device to process a modify End Point (EP) request from the MA USB host, the modify EP request to request for an updated EP handle corresponding to the USB device, said processor is configured to cause the MA USB device to transmit a modify EP response to the MA USB host, the modify EP response comprising the updated EP handle.

18. The system of claim 17, wherein said processor is configured to cause the MA USB device to process a control transfer request from the MA USB host, the control transfer request to trigger a transitioning of the USB device to the default state, said processor is configured to cause the MA USB device to transmit a control transfer response to the MA USB host, after the transitioning of the USB device to the default state and before receipt of the USB device reset request.

19. The system of claim 17, wherein said processor is configured to cause said MA USB device to, upon receipt of the USB device reset request, inform a USB controller of transition of the USB device to the default state, said processor is configured to cause said MA USB device to trigger said USB controller to initiate a USB device reset command.

20. A method to be performed at a media-agnostic (MA) Universal Serial Bus (USB) host of an MA USB Protocol Adaptation Layer (PAL), the method comprising:
communicating PAL traffic with an MA USB device over a communication link, said PAL traffic comprising traffic of a PAL connection over said MA USB PAL, said MA USB PAL is above a layer of said communication link;
transmitting a USB device reset request to said USB device, the USB device reset request comprising a handle of a USB device to be transitioned to a default state;
processing a USB device reset response received from said MA USB device via said communication link, the USB device reset response is in response to said USB device reset request; and
when the USB device reset response comprises a status code indicating the USB device reset request is successfully handled, transmitting a modify End Point (EP) request to the MA USB device to request for an updated EP handle corresponding to the USB device.

21. The method of claim 20 comprising processing a modify EP response from the MA USB device, the modify EP response comprising the updated EP handle corresponding to the USB device.

22. The method of claim 20 comprising transmitting a control transfer request to the MA USB device following a control USB Request block (URB) comprising an indication of a USB port reset corresponding to the USB device, and transmitting said USB device reset request subsequent to receipt of a control transfer response from the MA USB device.

23. A product including a non-transitory storage medium having stored thereon instructions that, when executed by a machine, result in performing operations at a media-agnostic (MA) Universal Serial Bus (USB) device of an MA USB Protocol Adaptation Layer (PAL), the operations comprising:

communicating PAL traffic with an MA USB host over a communication link, said PAL traffic comprising traffic of a PAL connection over said MA USB PAL, said MA USB PAL is above a layer of said communication link;

processing a USB device reset request from the MA USB host, the USB device reset request comprising a handle of a USB device to be transitioned to a default state;

transmitting a USB device reset response to said MA USB host over said communication link, the USB device reset response is in response to said USB device reset request, the USB device reset response comprising the handle of the USB device, and a success status code field to indicate whether the USB device reset request is successfully completed;

processing a modify End Point (EP) request from the MA USB host, the modify EP request to request for an updated EP handle corresponding to the USB device; and transmitting a modify EP response to the MA USB host, the modify EP response comprising the updated EP handle.

24. The product of claim 23, wherein said instructions result in processing a control transfer request from the MA USB host, the control transfer request to trigger a transitioning of the USB device to the default state; and transmitting a control transfer response to the MA USB host, after the transitioning of the USB device to the default state and before receipt of the USB device reset request.

25. The product of claim 23, wherein said instructions result in upon receipt of the USB device reset request, informing a USB controller of transition of the USB device to the default state; and triggering said USB controller to initiate a USB device reset command.

26. The product of claim 23, wherein said communication link comprises a Media Access Control (MAC) layer link or an Internet-Protocol (IP) link.

* * * * *